(12) United States Patent
Tanifuji et al.

(10) Patent No.: US 8,373,397 B2
(45) Date of Patent: Feb. 12, 2013

(54) DC-DC CONVERTER AND SEMICONDUCTOR INTEGRATED CIRCUIT

(75) Inventors: Ryo Tanifuji, Fujisawa (JP); Nobuyasu Goto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 334 days.

(21) Appl. No.: 12/879,945

(22) Filed: Sep. 10, 2010

(65) Prior Publication Data

US 2011/0115456 A1 May 19, 2011

(30) Foreign Application Priority Data

Nov. 17, 2009 (JP) ................................. 2009-262164

(51) Int. Cl.
*G05F 1/40* (2006.01)

(52) U.S. Cl. ......................... 323/271; 323/284; 323/285

(58) Field of Classification Search .................. 323/222, 323/223, 225, 268, 271, 282–285, 288
See application file for complete search history.

(56) References Cited

U.S. PATENT DOCUMENTS

| 5,481,178 | A | 1/1996 | Wilcox et al. | |
| 6,127,815 | A | 10/2000 | Wilcox | |
| 6,366,066 | B1 | 4/2002 | Wilcox | |
| 6,946,823 | B2* | 9/2005 | Huang et al. | 323/282 |
| 7,279,870 | B2* | 10/2007 | Hasegawa et al. | 323/224 |
| 7,492,132 | B2* | 2/2009 | Kuroiwa et al. | 323/222 |
| 2011/0133711 | A1* | 6/2011 | Murakami et al. | 323/282 |
| 2012/0105035 | A1* | 5/2012 | Lee et al. | 323/282 |

OTHER PUBLICATIONS

Background Art Information.

* cited by examiner

*Primary Examiner* — Matthew Nguyen
(74) *Attorney, Agent, or Firm* — Knobbe, Martens, Olson & Bear LLP

(57) ABSTRACT

A DC-DC converter according to the present invention includes a monitoring circuit which monitors an output signal of a mode comparator and which outputs a mode change detection signal when the output of the mode comparator has output a light load mode signal, and a clamp circuit which is connected between power supply and ground and which changes a voltage at a first end of a filter circuit toward a preset prescribed voltage according to the mode change detection signal.

20 Claims, 6 Drawing Sheets

DC-DC CONVERTER AND SEMICONDUCTOR INTEGRATED CIRCUIT

CROSS-REFERENCE TO RELATED APPLICATION

This application is based upon and claims the benefit of priority from the prior Japanese Patent Application No. 2009-262164, filed on Nov. 17, 2009, the entire contents of which are incorporated herein by reference.

FIELD

Embodiments described herein relate generally to a DC-DC converter which outputs a predetermined voltage.

BACKGROUND

The DC-DC converter supplies a predetermined voltage and a predetermined current to a load by turning on/off one or a plurality of switch elements and controlling on/off time (pulse duty) of a switching pulse.

As this DC-DC converter, a switching DC-DC converter of inductor type having high conversion efficiency is frequently used. In the switching DC-DC converter, a current mode control scheme becomes a mainstream for the reason that the response speed is fine and phase compensation is simple.

For example, in the conventional current mode control DC-DC converter (see, for example, U.S. Pat. No. 6,127,815 and U.S. Pat. No. 6,366,066), a divided voltage obtained by dividing an output voltage by using resistors is input to an inverting input terminal of an error amplifier and a constant reference voltage is input to a non-inverting input terminal of the error amplifier. The pulse duty is controlled by a feedback loop so as to make the divided voltage coincide with the reference voltage. As a result, a desired voltage can be obtained by changing the resistance ratio.

In addition, a filter is connected to the output of the error amplifier, and phase compensation is conducted so as to bring the DC-DC control loop into stable operation.

Among various characteristics of the DC-DC converter, the conversion efficiency is very important. Especially in portable devices, demand for the conversion efficiency is very strict because it is linked directly with a battery life. Therefore, it is demanded that the DC-DC converter operates with low power dissipation as far as possible.

Especially in the DC-DC converter of the current mode control scheme, the switching loss and loss caused by current dissipation becomes dominant in the state of a light load which has little load. Therefore, the DC-DC converter of the current mode control scheme is demanded to operate in "light load mode" with the current dissipation reduced to improve the efficiency.

In the conventional DC-DC converter, the output of the error amplifier which equivalently indicates the peak current of the inductor is monitored by a mode comparator, and the mode is determined to be the light load mode when the output of the error amplifier has become a certain threshold voltage or less (i.e., when the load current has become a certain value or less) (see U.S. Pat. No. 6,127,815 and U.S. Pat. No. 6,366,066 described above).

In the light load mode, all or a part of unnecessary circuits is turned off to suppress the current dissipation and improve the efficiency. The mode comparator has hysteresis to prevent immediate return to a normal mode.

The conventional DC-DC converter has a problem that the current dissipation of the error amplifier cannot be suppressed. For improving the conversion efficiency, it is necessary to reduce the current dissipation of the error amplifier as well in the light load mode.

However, a problem is caused at the time of return to the normal mode.

In other words, the timing of return from the light load mode to the normal mode is when the load current increases and the error amplifier output has exceeded the threshold voltage and the hysteresis of the mode comparator. At this time, the output of the mode comparator is inverted to bring about the normal mode operation, and the error amplifier output arrives at a voltage value depending on a required load current (indictor current), resulting in the stationary state.

If the current dissipation of the error amplifier is decreased in the light load mode (or an error amplifier having low current dissipation is used) to improve the efficiency, a large output voltage drop is caused at the time of return from the light load mode to the normal mode.

This output voltage drop is caused because the error amplifier has a low current and consequently the time for charging up the filter circuit connected to the error amplifier output is prolonged.

In other words, the output voltage (filter voltage) of the error amplifier is proportionate to the peak current of the inductor. The demanded load current cannot be let flow unless this voltage is raised. Therefore, the energy supply becomes insufficient and the output voltage drops greatly.

The great output voltage drop causes false operation in some connected applications. Therefore, the DC-DC converter is demanded to supply a voltage of a desired level stably.

If the error amplifier current is reduced to improve the efficiency, the output voltage drop at the time of mode transition becomes great. On the other hand, if the error amplifier current is increased to avoid the output voltage drop, the efficiency is aggravated.

Therefore, the conventional DC-DC converter has a problem that it becomes difficult to reduce the current dissipation of the error amplifier.

DETAILED DESCRIPTION

A DC-DC converter which turns off all or a part of unnecessary circuits and operates at time of light load mode, the DC-DC converter comprising: a first MOS transistor connected at a first end thereof to a power supply and connected at a second end thereof to a first terminal; a second MOS transistor connected at a first end thereof to the first terminal and connected at a second end thereof to ground; a coil connected at a first end thereof to the first terminal and connected at a second end thereof to an output terminal; a capacitor connected between the second end of the coil and the ground; and a voltage divider circuit which outputs a divided voltage obtained by dividing a voltage at the output terminal.

The DC-DC converter further comprising: an error amplifier which is supplied with the divided voltage and a reference voltage, and which outputs a comparison result signal according to a result of comparison between the divided voltage and the reference voltage; a filter circuit which is connected at a first end thereof to the output of the error amplifier, which is connected at a second end thereof to the ground, and which compensates for a phase of the comparison result signal output by the error amplifier; a control circuit which turns on/off the first MOS transistor and the second MOS transistor complementary by outputting control signals to gates of the first MOS transistor and the second MOS transistor, the control signals being pulse signals; a mode comparator which is supplied with the comparison result signal and a threshold voltage, which outputs a normal mode signal when the comparison result signal is greater than the threshold voltage, and which outputs a light load mode signal when the comparison result signal is less than the threshold voltage; and an assisting circuit which assists boosting of an output of the error amplifier when an output signal of the mode comparator changes from the light load mode signal to the normal mode signal.

Embodiments will now be explained with reference to the accompanying drawings.

(First Embodiment)

Figure 1:
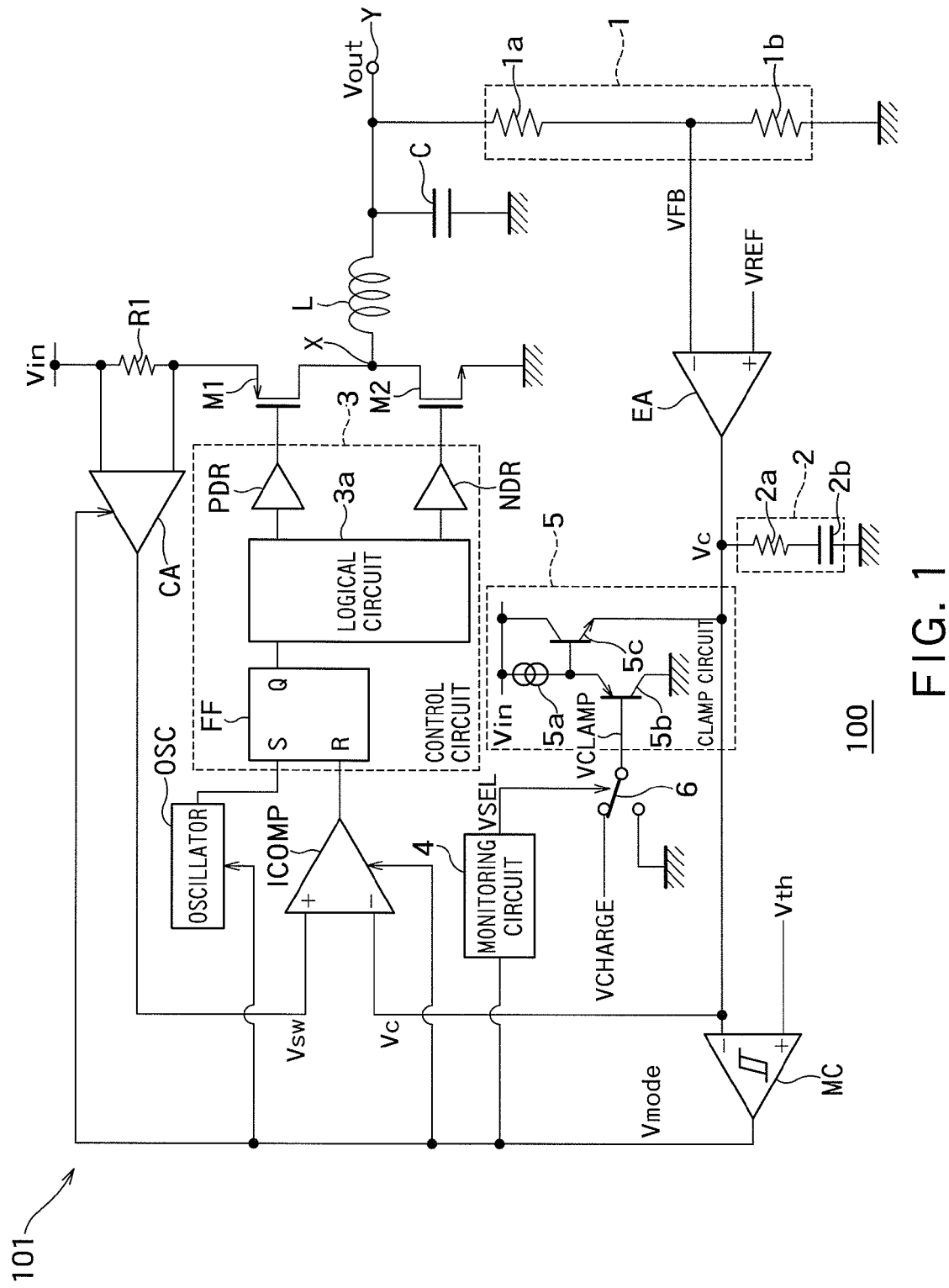
FIG. 1 is a block diagram showing an example of a configuration of a DC-DC converter 100 according to a first embodiment.
Figure 2:
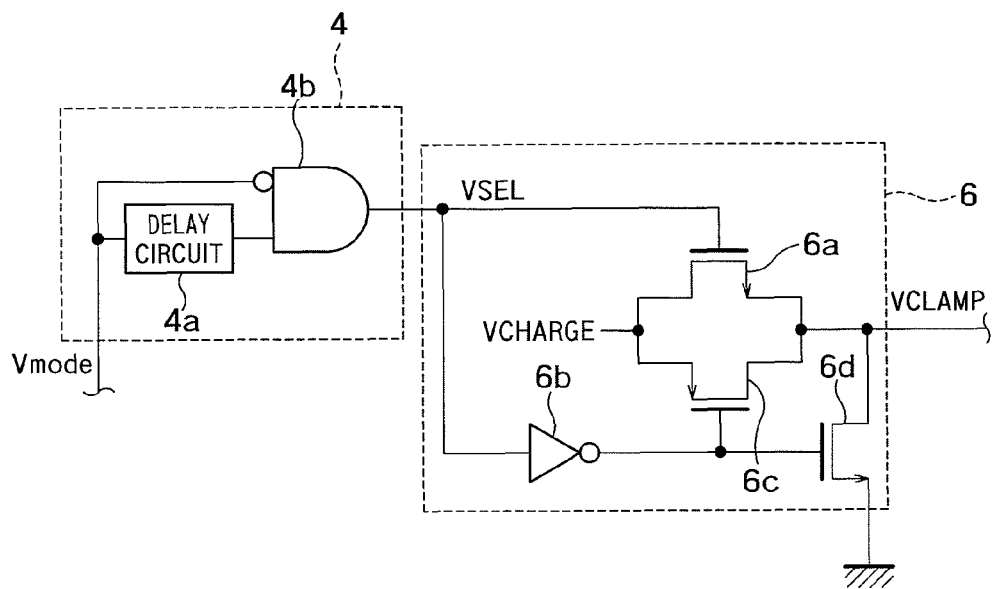
FIG. 2 is a circuit diagram showing an example of a circuit configuration of a monitoring circuit 4 and a switch circuit 6 in the DC-DC converter 100 shown in FIG. 1.
Figure 3:
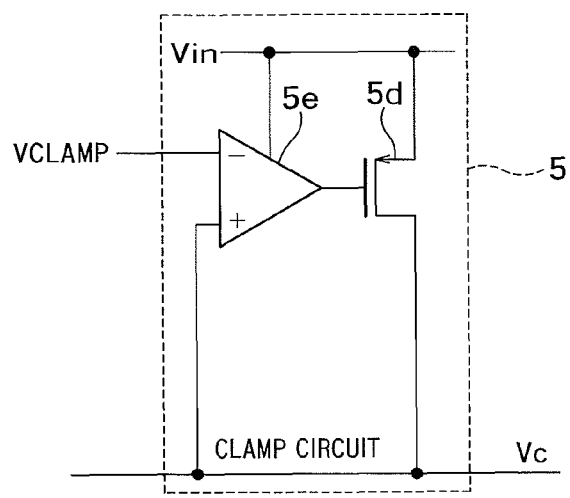
FIG. 3 is a circuit diagram showing another example of the circuit configuration of a clamp circuit 5 in the DC-DC converter 100 shown in FIG. 1.

FIG. 1 is a block diagram showing an example of a configuration of a DC-DC converter 100 according to a first embodiment. FIG. 2 is a circuit diagram showing an example of a circuit configuration of a monitoring circuit 4 and a switch circuit 6 in the DC-DC converter 100 shown in FIG. 1. FIG. 3 is a circuit diagram showing another example of the circuit configuration of a clamp circuit 5 in the DC-DC converter 100 shown in FIG. 1.

As shown in FIG. 1, the DC-DC converter 100 includes a voltage divider circuit 1, a filter circuit 2, a control circuit 3, a monitoring circuit 4, the clamp circuit 5, a switch circuit 6, a first MOS transistor M1, a second MOS transistor M2, a coil L, a capacitor C, a current detection resistor R1, a current amplifier CA, an error amplifier EA, a current comparator ICOMP, an oscillator OSC, a mode comparator MC, a first terminal X, and an output terminal Y.

The first MOS transistor M1 is connected at its first end (source) to a power supply Vin via the current detection resistor R1, and connected at its second end (drain) to the first terminal X. The first MOS transistor M1 is, for example, a pMOS transistor.

The second MOS transistor M2 is connected at its first end (drain) to the first terminal X and connected at its second end (source) to the ground. The second MOS transistor M2 is, for example, an nMOS transistor.

The coil L is connected at its first end to the first terminal X and connected at its second end to the output terminal Y.

The capacitor C is connected between the second end of the coil L and the ground.

The voltage divider circuit 1 divides a voltage at the output terminal and outputs a divided voltage VFB obtained by the division.

The voltage divider circuit 1 includes a first voltage division resistor 1a and a second voltage division resistor 1b. The first voltage division resistor 1a is connected at its first end to the output terminal Y. The second voltage division resistor 1b is connected between a second end of the first voltage division resistor 1a and the ground. In this case, the voltage divider circuit 1 outputs a voltage between the first voltage division resistor 1a and the second voltage division resistor 1b as the divided voltage VFB.

As already described, the current detection resistor R1 is connected between the power supply Vin and the first end (source) of the first MOS transistor M1.

The current amplifier CA is adapted to output a current detected signal Vsw depending on a current value of a current which flows through the current detection resistor R1. The current amplifier CA monitors, for example, a peak value of an inductor current which flows through the coil L. In other words, the current detected signal Vsw assumes a value depending on the inductor current.

The divided voltage VFB is input to an inverting input terminal of the error amplifier EA, and a reference voltage VREF is input to a non-inverting input of the error amplifier EA. The error amplifier EA is adapted to output a comparison result signal Vc depending on a result obtained by comparing the divided voltage VFB with the reference voltage VREF.

In other words, for example, the error amplifier EA raises the voltage of the comparison result signal Vc (outputs a "high" level) in the case where the divided voltage VFB is equal to or less than the reference voltage VREF (the output voltage Vout is equal to less than a target value). On the other hand, the error amplifier EA lowers the voltage of the comparison result signal Vc (outputs a "low" level) in the case where the divided voltage VFB is higher than the reference voltage VREF (the output voltage Vout is higher than the target value).

The filter circuit 2 is connected at its first end to the output of the error amplifier EA and connected at its second to the ground. The filter circuit 2 is adapted to compensate the phase of the comparison result signal Vc which is output by the error amplifier EA. As a result, the DC-DC control loop is in stable operation.

The filter circuit 2 includes, for example, a filter resistor 2a and a filter capacitance 2b. The filter capacitance 2b is connected between the output of the error amplifier EA and the ground. The filter resistor 2a is connected in series with the filter capacitance 2b between the output of the error amplifier EA and the ground.

The current comparator ICOMP is adapted to be supplied with the comparison result signal Vc and the current detection signal Vsw, and output a reset signal which depends on a result obtained by comparing the comparison result signal Vc with the current detection signal Vsw.

The oscillator OSC is adapted to output a set signal (for example, a signal of "high" level) which is an oscillating oscillation signal at constant periods.

The control circuit 3 is adapted to output a control signal which is a pulse signal to gates of the first MOS transistor M1 and the second MOS transistor M2 according to the set signal and turn on/off the first MOS transistor M1 and the second MOS transistor M2 complementarily. In addition, the control circuit 3 is adapted to control the pulse duty ratio of the control signal according to the reset signal.

The control circuit 3 includes, for example, a flip-flop FF, a logic circuit 3a, and drivers PDR and NDR.

The reset signal is input to a reset terminal R of the flip-flop FF, and the set signal is input to a set terminal of the flip-flop FF. The flip-flop FF outputs a signal from an output terminal Q according to the set signal and the reset signal.

The logic circuit 3a outputs the control signal to the gates of the first and second MOS transistors M1 and M2 via the drivers PDR and VDR which output the signal according to the output signal of the flip-flop FF.

In the DC-DC converter 100, the pulse duty is controlled by the feedback loop so as to make the divided voltage VFB coincide with the reference voltage VREF. As a result, the output voltage Vout can be set to a predetermined value by changing the resistance ratio in the voltage divider circuit 1.

In this way, the DC-DC converter 100 conducts PWM (Pulse Width Modulation) control by using a set signal supplied from the oscillator at constant periods and a reset signal generated by comparing the voltage Vsw with the voltage Vc.

As shown in FIG. 1, the mode comparator MC is adapted to be supplied with the comparison result signal Vc and the threshold voltage Vth, and output a signal Vmode obtained by comparing the comparison result signal Vc with the threshold voltage Vth.

In other words, if the comparison result signal Vc is greater than the threshold voltage Vth, the mode comparator MC outputs a normal mode signal (for example, the signal Vmode of the "low" level to bring the oscillator OSC, the current comparator ICOMP, and the current amplifier CA into ordinary operation.

On the other hand, if the comparison result signal Vc is equal to or less than the threshold voltage Vth, the mode comparator MC outputs a light load mode signal (for example, the signal Vmode of the "high" level) to stop operation of at least one of the oscillator OSC, the current comparator ICOMP, and the current amplifier CA.

In response to the light load mode signal, at least one of the oscillator OSC, the current comparator ICOMP, and the current amplifier CA stops operation. Especially, power dissipation can be further reduced by stopping operation of all of oscillator OSC, the current comparator ICOMP, and the current amplifier CA.

In this way, the mode comparator MC monitors the output voltage Vc of the error amplifier which equivalently indicates the peak current of the inductor by using the mode comparator, and determines the mode to be the light load mode when the comparison result signal Vc has become a certain threshold voltage Vth or less (the load current has become a certain value or less).

Here, the mode comparator MC has hysteresis characteristics to prevent immediate return to the normal mode.

The monitoring circuit 4 monitors the output signal Vmode of the mode comparator MC. The monitoring circuit 4 outputs a signal VSEL according to the monitored state.

In other words, when the output signal Vmode of the mode comparator MC has changed from the light load mode signal to the normal mode signal, the monitoring circuit 4 outputs a mode change detection signal (for example, VSEL of "high level") for a preset prescribed period T1. In other cases, the monitoring circuit 4 outputs an undetected signal (for example, VSEL of "low level").

The monitoring circuit 4 includes, for example, a delay circuit 4a and an AND circuit 4b.

The delay circuit 4a delays the output signal Vmode of the mode comparator MC by the prescribed time T1 and outputs it. The output signal Vmode of the mode comparator MC is input to an inverting input terminal of the AND circuit 4b, an output signal of the delay circuit 4a is input to a non-inverting input terminal of the AND circuit 4b. The AND circuit 4b conducts operation on these input signals and outputs the signal VSEL (the mode change detection signal or the undetected signal)

The switch circuit 6 outputs a different voltage according to the signal VSEL. In other words, when the monitoring circuit 4 has output the mode change detection signal, the switch circuit 6 outputs a charge voltage VCHARGE which is higher than the ground voltage. On the other hand, when the monitoring circuit 4 outputs the undetected signal (in other cases), the switch circuit 6 outputs the ground voltage.

As shown in FIG. 2, the switch circuit 6 includes, for example, an nMOS transistor 6a which forms a transmission gate, an inverter 6b, a pMOS transistor 6c which forms the transmission gate, and an nMOS transistor 6d.

The nMOS transistor 6a is connected at its gate to the AND circuit 4b. A charge voltage VCHARGE which is higher than the ground voltage is applied to a first end (drain) of the nMOS transistor 6a.

The inverter 6b is connected at its input to the output of the AND circuit 4b.

The pMOS transistor 6c is connected at its first end (source) to the first end (drain) of the nMOS transistor 6a, connected at its second (end) to a second end (source) of the nMOS transistor 6a, and connected at its gate to an output of the inverter 6b.

The nMOS transistor 6d is connected between the second end (source) of the nMOS transistor 6a and the ground, and connected at its gate to an output of the inverter 6b.

For example, when the output signal Vmode of the mode comparator MC has changed from the light load mode signal to the normal mode signal, the monitoring circuit 4 outputs the mode change detection signal (for example, the signal VSEL of the "high level) for a preset prescribed period T1. As a result, the transmission gate turns on. In this state, a clamp voltage VCLAMP becomes charge voltage VCHARGE.

As already described, the monitoring circuit 4 outputs the undetected signal (for example, the signal VSEL of the "low" level). As a result, the transmission gate is in the off state, and the clamp voltage VCLAMP becomes the ground voltage.

As shown in FIG. 1, the clamp circuit 5 is connected between the power supply Vin and the ground. The clamp circuit 5 changes (raises) the voltage at the first end of the filter circuit 2 (output voltage of the error amplifier EA, i.e., the comparison result signal Vc) toward a preset prescribed voltage for the prescribed period T1 in response to the mode change detection signal. In other words, boosting of the output of the error amplifier EA is assisted during the prescribed period.

The prescribed period T1 is for example, a period required to raise the voltage at the first end of the filter circuit 2 to the prescribed voltage.

As shown in FIG. 1, the clamp circuit 5 includes, for example, a constant current circuit 5a, and an NPN bipolar transistor 5c.

The constant current circuit 5a is connected at its first end to the power supply Vin and is adapted to output a constant current.

A PNP bipolar transistor 5b is connected at its emitter to a second end of the constant current circuit 5a, connected at its collector to the ground, and connected at its base to an output of the switch circuit 6.

A NPN bipolar transistor 5c is connected at its collector to the power supply Vin, connected at its emitter to a first end of the filter circuit 2, and connected at its base to a second end of the constant current circuit 5a.

If a charge voltage VCHARGE is applied to the PNP bipolar transistor 5b, a base current of the NPN bipolar transistor 5c flows and a current flows between the emitter and the collector. As a result, the comparison result signal (the voltage at the first end of the filter circuit 2) Vc changes (rises). In other words, boosting of the output of the error amplifier EA is assisted.

The clamp circuit 5 may be formed by using a MOS transistor as shown in FIG. 3. In other words, the clamp circuit 5 includes, for example, a clamp MOS transistor 5d and a clamp comparator 5e.

The clamp MOS transistor 5d is connected between the power supply Vin and the ground.

The output VCLAMP of the switch circuit 6 and the comparison result signal Vc are input to the clamp comparator 5e. An output of the clamp comparator 5e is connected to the clamp MOS transistor 5d at its gate.

When a charge voltage VCHARGE which is higher than the comparison result signal Vc is input from the switch circuit 6 to the clamp comparator 5e, the clamp comparator 5e turns on the clamp MOS transistor 5d. As a result, the comparison result signal (voltage at the first end of the filter circuit 2) Vc changes (rises). In other words, boosting of the output of the error amplifier EA is assisted.

If the comparison result signal (voltage at the first end of the filter circuit 2) Vc becomes the charge voltage VCHARGE or above, the clamp comparator 5e turns off the clamp MOS transistor 5d.

Incidentally, for example, the filter circuit 2, the control circuit 3, the monitoring circuit 4, the clamp circuit 5, the switch circuit 6, the first MOS transistor M1, the second MOS transistor M2, the current detection resistor R1, the current amplifier CA, the error amplifier EA, the current comparator ICOMP, the oscillator OSC, the mode comparator MC and the first terminal X form a semiconductor integrated circuit 101 which is mounted on one chip. The semiconductor integrated circuit 101 is applied to the DC-DC converter 100.

An example of operation conducted when transition is made in the mode of the DC-DC converter 100 having a configuration heretofore described will now be described.

Figure 4:
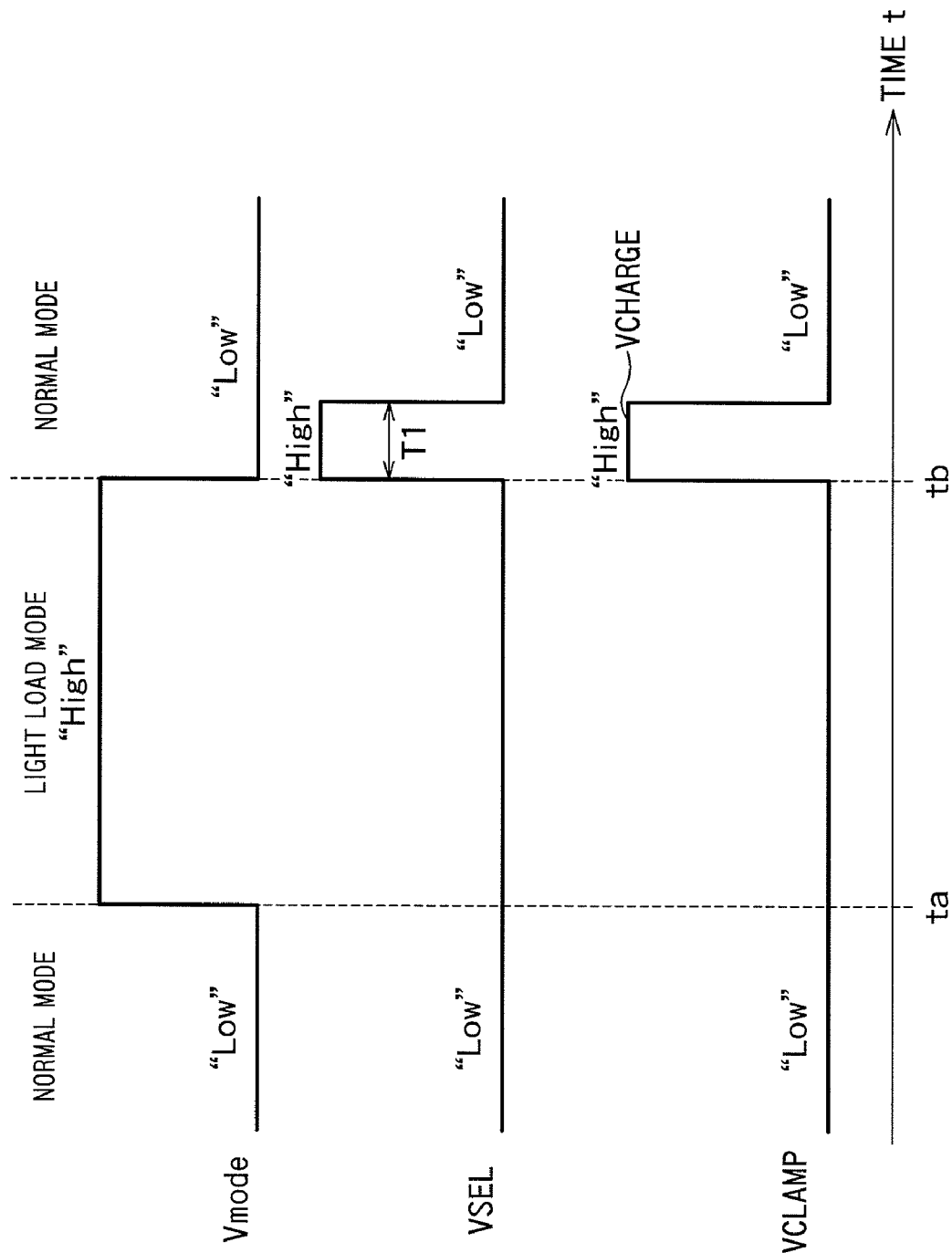
FIG. 4 is a diagram showing an example of voltage waveforms of output signals of the mode comparator MC, the monitoring circuit 4, and the switch circuit 6 in the DC-DC converter 100 shown in FIG. 1.

FIG. 4 is a diagram showing an example of voltage waveforms of output signals of the mode comparator MC, the monitoring circuit 4, and the switch circuit 6 in the DC-DC converter 100 shown in FIG. 1.

When the comparison result signal Vc is greater than the threshold voltage Vth, the mode comparator MC outputs a normal mode signal (the signal Vmode of the "low" level). At this time, the monitoring circuit 4 outputs the undetected signal (for example, the signal VSEL of the "low" level). As a result, the transmission gate of the switch circuit 6 is in the off state, and the clamp voltage VCLAMP becomes the ground voltage.

If the comparison result signal Vc becomes greater than the threshold voltage Vth at time ta, the mode comparator MC outputs the light load mode signal (for example, the signal Vmode of the "high" level).

If the comparison result signal Vc becomes greater than the threshold voltage Vth at time tb, the mode comparator MC changes the output signal Vmode from the light load mode signal to the normal mode signal. At this time, the monitoring circuit 4 outputs the mode change detection signal (the signal VSEL of the "high" level) for a preset prescribed period T1. As a result, the transmission gate in the switch circuit 6 turns on. In this state, the clamp voltage VCLAMP becomes the charge voltage VCHARGE ("high" level).

As a result, if a charge voltage VCHARGE is applied to the PNP bipolar transistor 5b, then a base current of the NPN bipolar transistor 5c flows and a current flows between the emitter and collector. As a result, the comparison result signal (voltage at the first end of the filter circuit 2) changes (rises). In other words, boosting of the output of the error amplifier EA is assisted for the prescribed period T1.

In this way, even if the error amplifier EA having a small current capability is used to improve the efficiency, it is possible to charge up the filter circuit 2 quickly by the clamp circuit 5 at the time of the mode transition and lift the output voltage of the error amplifier EA.

As a result, a desired current can be let flow through the load, and the output voltage drop can be made small.

In the DC-DC converter according to the present embodiment, the current dissipation can be reduced as heretofore described.

(Second Embodiment)

In the first embodiment, an example of a configuration which assists boosting of the output of the error amplifier by using the clamp circuit according to the output of the mode comparator has been described.

In the second embodiment, an example of a configuration which assists boosting of the output of the error amplifier by using an amplifier according to a divided voltage output from a voltage divider circuit will now be described.

Figure 5:
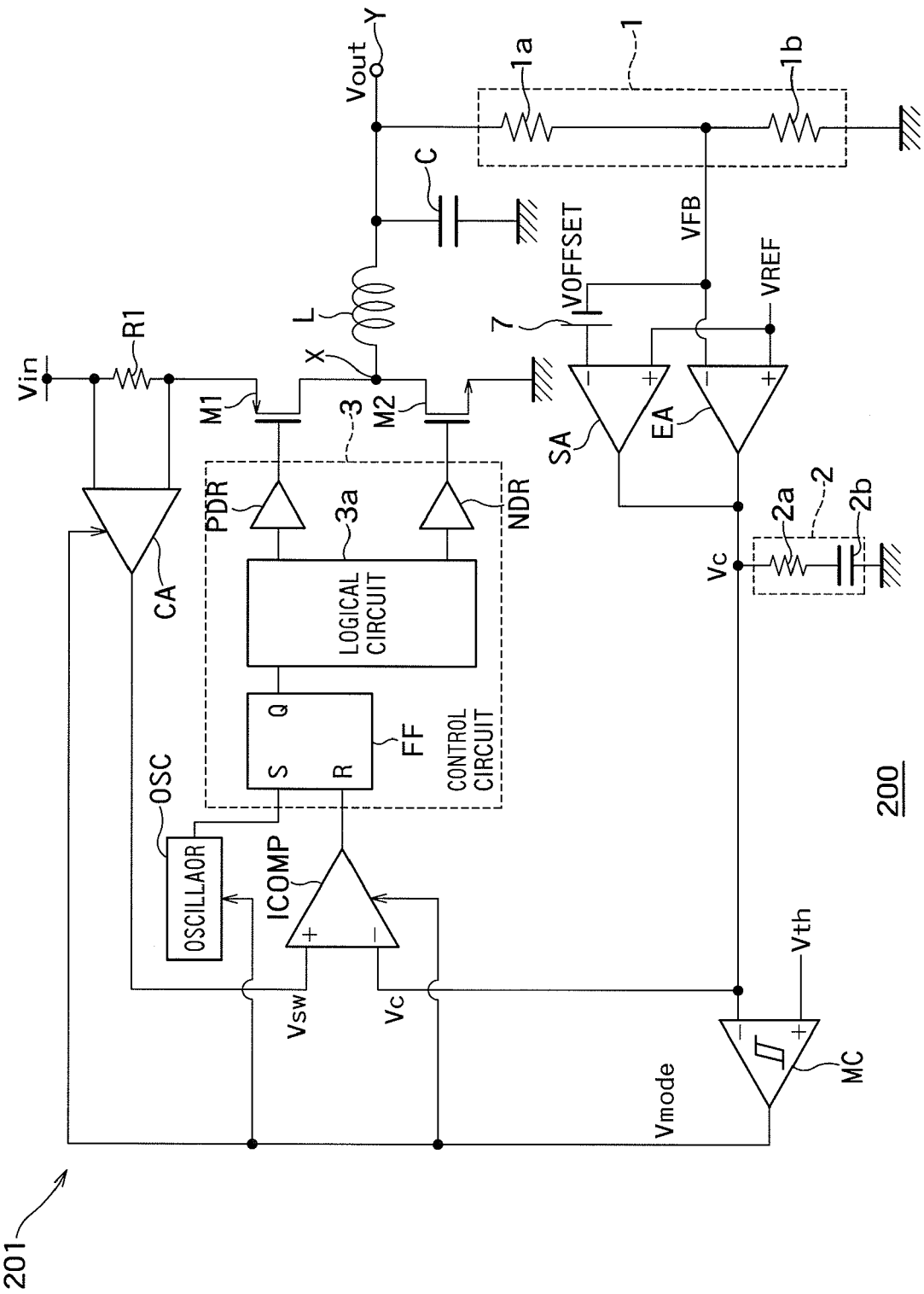
FIG. 5 is a block diagram showing an example of a configuration of a DC-DC converter 200 according to the second embodiment.

FIG. 5 is a block diagram showing an example of a configuration of a DC-DC converter 200 according to the second embodiment. In FIG. 5, the same character as that in FIG. 1 indicates like element in the first embodiment.

As shown in FIG. 5, the DC-DC converter 200 includes a voltage divider circuit 1, a filter circuit 2, a control circuit 3, an offset circuit 7, a first MOS transistor M1, a second MOS transistor M2, a coil L, a capacitor C, a current detection resistor R1, a current amplifier CA, an error amplifier EA, a sub-amplifier SA, a current comparator ICOMP, an oscillator OSC, a mode comparator MC, a first terminal X, and an output terminal Y.

In other words, the DC-DC converter 200 is obtained by removing the monitoring circuit 4, the clamp circuit 5, and the switch circuit 6 from the DC-DC converter 100 in the first embodiment and adding the offset circuit 7 and the sub-amplifier SA.

The offset circuit 7 is a DC voltage source connected at its first end to the output of the voltage divider circuit 1 and connected at its second end to an inverting input terminal of the sub-amplifier SA. This offset circuit 7 is adapted to output an added voltage obtained by adding an offset voltage VOFFSET to the divided voltage VFB.

The sub-amplifier SA is supplied with the added voltage at its inverting input terminal, and supplied with a reference voltage VREF at its non-inverting input terminal. Outputs of the sub-amplifier SA and the error amplifier EA are connected to each other.

In the DC-DC converter 200, the sub-amplifier SA is connected in parallel with the error amplifier EA in this way.

As already described, the added voltage is input to the inverting input terminal of the sub-amplifier SA. When the feedback voltage VFB and the reference voltage VREF are close to each other (steady state), therefore, the sub-amplifier SA does not operate. When the sub-amplifier SA does not operate, it outputs little output.

On the other hand, only when the output voltage Vout has been dropped by a sudden change of the load, a mode transition or the like, the sub-amplifier SA lets a great current flow and compensates for an output current capability of the error amplifier EA.

When the output voltage Vout has dropped, therefore, quick return to the original level is possible.

Incidentally, for example, the filter circuit 2, the control circuit 3, the offset circuit 7, the first MOS transistor M1, the second MOS transistor M2, the current detection resistor R1, the current amplifier CA, the sub-amplifier SA, the error amplifier FA, the current comparator ICOMP, the oscillator OSC, the mode comparator MC, and the first terminal X form a semiconductor integrated circuit 201 which is mounted on one chip. The semiconductor integrated circuit 201 is applied to the DC-DC converter 200 as already described.

Figure 6:
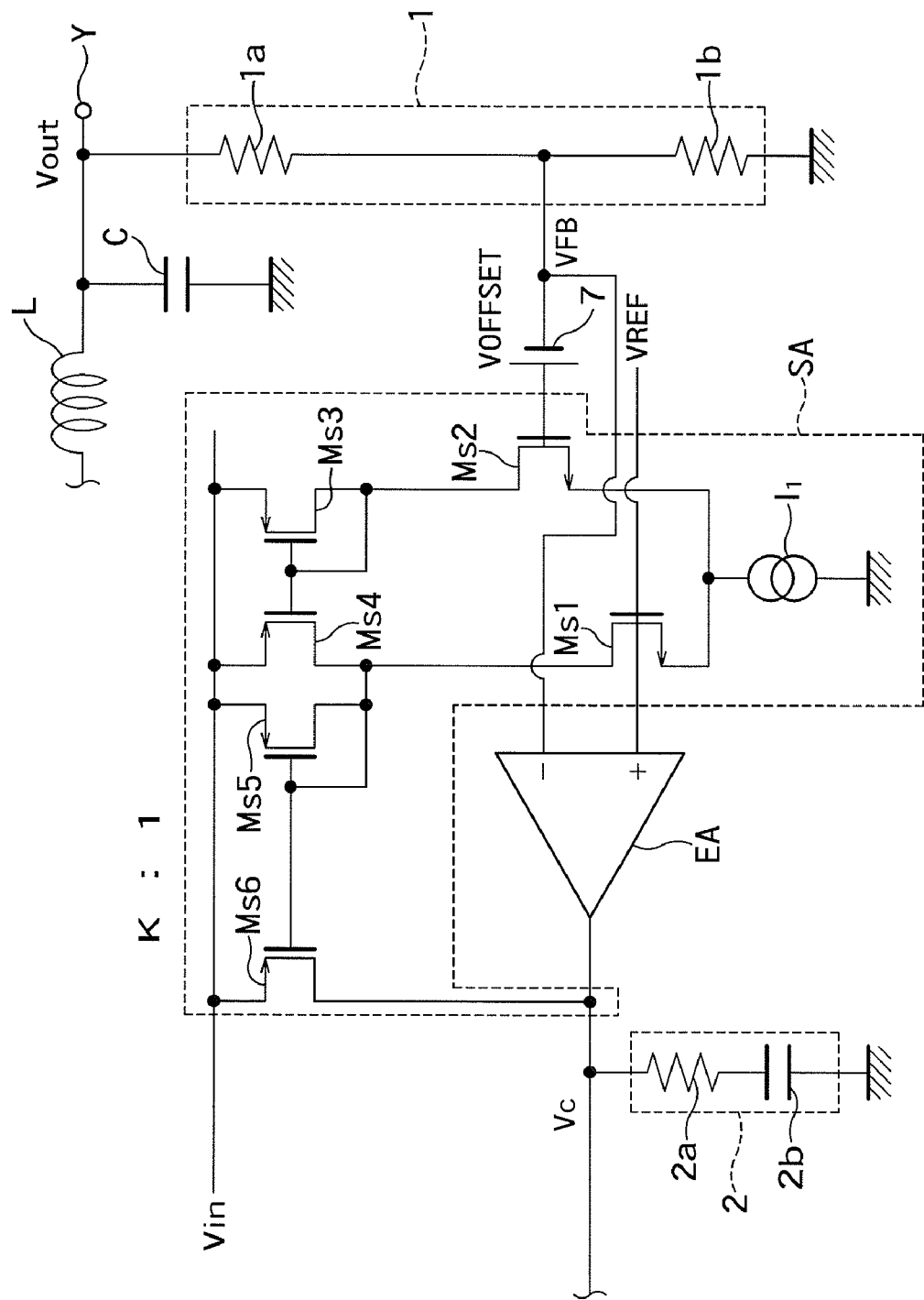
FIG. 6 is a circuit diagram showing an example of a circuit configuration of the sub-amplifier SA in the DC-DC converter 200 shown in FIG. 5.

FIG. 6 is a circuit diagram showing an example of a circuit configuration of the sub-amplifier SA in the DC-DC converter 200 shown in FIG. 5.

As shown in FIG. 6, the sub-amplifier SA includes nMOS transistors Ms1 and Ms2, pMOS transistors Ms3, Ms4, Ms5 and Ms6, and a current supply I1.

At the time of ordinary operation (the divided voltage VFB≈the reference voltage VREF), the offset voltage VOFFSET is added to the divided voltage VFB and consequently the current of the current supply flows through the nMOS transistor Ms2 and the pMOS transistor Ms3. Therefore, the current of the current supply I1 does not flow through the nMOS transistor Ms1 and the pMOS transistor Ms4.

At this time, a current does not flow through the pMOS transistor Ms5, either. Therefore, the pMOS transistor Ms5 is in the off state. The pMOS transistors Ms5 and Ms6 form a current mirror having a large ratio (K times in FIG. 6). As a result, the pMOS transistor Ms5 is off. Therefore, the pMOS transistor Ms6 is in the off state.

In other words, at the time of ordinary operation, the sub-amplifier SA does not supply a current to the output of the error amplifier EA. The feedback loop control is conducted by only the error amplifier EA. The current dissipation of the sub-amplifier SA is only the current I1.

On the other hand, when the output voltage Vout is dropped by a sudden change of the load, mode transition, or the like and the relation represented by the divided voltage VFB<added voltage (VREF−VOFFSET) is satisfied, the current flowing through the nMOS transistor Ms1 becomes greater than the current flowing through the pMOS transistor Ms4.

A current ΔI which is a difference between the two currents flows through the pMOS transistor Ms5. If the current ΔI flows, the pMOS transistor Ms5 turns on. The pMOS transistor Ms5 and the pMOS transistor Ms6 form a current mirror of K times. As a result, a current which is equal to the current ΔI×K is supplied to the output of the error amplifier EA to charge up the filter circuit 2.

The output of the error amplifier EA is proportionate to the peak current of the inductor. Since a large current is let flow through the load, quick return of the output voltage to the target value is possible.

Since the response speed can be compensated for by the sub-amplifier SA in this way, the current of the error amplifier EA can be reduced.

When the output voltage Vout is close to the preset value, the sub-amplifier SA lets little current flow. Therefore, the increase of the current dissipation caused by addition of the sub-amplifier SA is slight. Since the efficiency improvement at the time of light load can be desired without lowering the response speed, prolonging of the battery life in the portable device and the heat suppression effect brought about by efficiency improvement can be expected.

In this way, the DC-DC converter 200 brings about an effect in suppressing the drop of the output voltage Vout at the time of transition from the light load mode to the normal mode. However, the DC-DC converter 200 is also useful at the time of drop of the output voltage Vout caused by a sudden change of the load or the like.

According to the DC-DC converter 200 in the present embodiment, the current dissipation can be reduced as described heretofore.

(Third Embodiment)

In a third embodiment, an example of a configuration obtained by combining the configuration of the first embodiment with the configuration of the second embodiment will be described.

Figure 7:
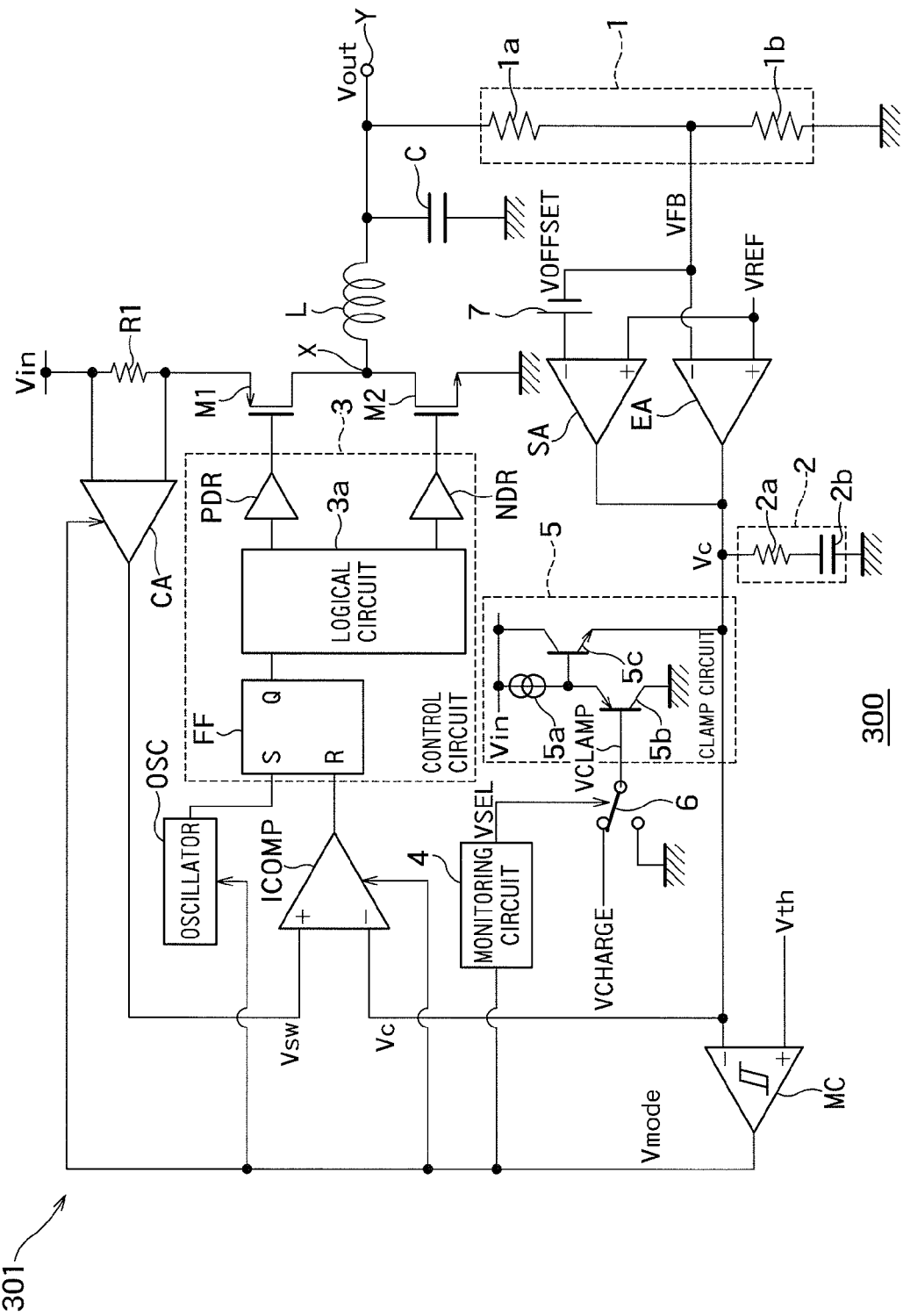
FIG. 7 is a block diagram showing an example of a configuration of a DC-DC converter 300 according to a third embodiment.

FIG. 7 is a block diagram showing an example of a configuration of a DC-DC converter 300 according to a third embodiment. In FIG. 7, the same character as that in FIGS. 1 and 5 denote like elements in the first and second embodiments.

As shown in FIG. 7, the DC-DC converter 300 includes a voltage divider circuit 1, a filter circuit 2, a control circuit 3, a monitoring circuit 4, a clamp circuit 5, a switch circuit 6, an offset circuit 7, a first MOS transistor M1, a second MOS transistor M2, a coil L, a capacitor C, a current detection resistor R1, a current amplifier CA, an error amplifier EA, a sub-amplifier SA, a current comparator ICOMP, an oscillator OSC, a mode comparator MC, a first terminal X, and an output terminal Y.

In other words, the DC-DC converter 300 is obtained by adding an offset circuit 7 and a sub-amplifier SA to the DC-DC converter 100 in the first embodiment.

For example, the filter circuit 2, the control circuit 3, the monitoring circuit 4, the clamp circuit 5, the switch circuit 6, the offset circuit 7, the first MOS transistor M1, the second MOS transistor M2, the current detection resistor R1, the current amplifier CA, the sub-amplifier SA, the error amplifier EA, the current comparator ICOMP, the oscillator OSC, the mode comparator MC, and the first terminal X form a semiconductor integrated circuit 301. This semiconductor integrated circuit 301 is applied to the DC-DC converter 300 as already described.

Operation of the DC-DC converter 300 having a configuration described heretofore, conducted at the time of a mode transition is the same as that of the DC-DC converter 100 in the first embodiment.

In other words, even if the error amplifier EA having a small current capability is used to improve the efficiency, it is possible to charge up the filter circuit 2 quickly by the clamp circuit 5 at the time of the mode transition and lift the output voltage of the error amplifier EA in the same way as the first embodiment.

Furthermore, in the DC-DC converter 300, the current of the error amplifier EA can be reduced in the same way as the second embodiment because the response speed can be compensated for by the sub-amplifier SA.

In the same way as the second embodiment, the DC-DC converter 300 brings about an effect in suppressing the drop of the output voltage Vout at the time of transition from the light load mode to the normal mode. However, the DC-DC converter 300 is also useful at the time of drop of the output voltage Vout caused by a sudden change of the load or the like.

According to the DC-DC converter in the present embodiment, the current dissipation can be reduced as compared with the first and second embodiments as described heretofore.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter configured to turn off at least an unnecessary circuit part of the DC-DC converter when operating in a light load mode, the DC-DC converter comprising:
a first MOS transistor connected at a first terminal to a power supply and connected at a second terminal to a first node;
a second MOS transistor connected at a first terminal to the first node and connected at a second terminal to ground;
a coil connected at a first terminal to the first node and connected at a second terminal to an output terminal;
a capacitor connected at a first terminal to the second terminal of the coil and connected at a second terminal to ground;
a voltage divider configured to divide a voltage at the output terminal and to output the divided voltage;
an error amplifier configured to receive the divided voltage and a reference voltage, wherein the error amplifier is configured to output a voltage based on comparison of a reference voltage to the divided voltage;
a filter connected at a first terminal to the output of the error amplifier and connected at a second terminal to ground, wherein the filter is configured to compensate for a phase of the voltage signal output by the error amplifier;
a control circuit configured to turn the first MOS transistor and the second MOS transistor on and off in a complementary manner by outputting control signals to gates of the first MOS transistor and the second MOS transistor, the control signals being pulse signals;
a mode comparator configured to receive the voltage output from the error amplifier and a threshold voltage, wherein the mode comparator is configured to output a normal mode signal when the voltage output from the error amplifier is greater than the threshold voltage, and to output a light load mode signal when the voltage output from the error amplifier is less than the threshold voltage; and
an assisting circuit configured to assist boosting of the voltage output from the error amplifier when the output signal of the mode comparator changes from the light load mode signal to the normal mode signal.

2. The DC-DC converter of claim 1, wherein the assisting circuit comprises a clamp circuit configured to change a voltage at the first terminal of the filter to a preset voltage when the output signal of the mode comparator changes from the light load mode signal to the normal mode signal.

3. The DC-DC converter of claim 2, further comprising:
a current detection resistor connected at a first terminal to the power supply and connected at a second terminal to the first terminal of the first MOS transistor;
a current amplifier configured to output a voltage based on a current flowing through the current detection resistor;
a current comparator configured to receive the voltage output from the error amplifier and the voltage output from the current amplifier, wherein the current comparator is configured to compare the voltage output from the error amplifier with the voltage output from the current amplifier and to output a reset signal based on the result;
an oscillator configured to output a set signal, wherein the set signal is oscillating; and
a monitoring circuit configured to monitor the output signal of the mode comparator, and to output a mode change detection signal when the output signal of the mode comparator changes from the light load mode signal to the normal mode signal,
wherein the control circuit is configured to turn the first MOS transistor and the second MOS transistor on and off in a complementary manner by outputting the control signal according to the set signal, and to control a pulse duty ratio of the control signal according to the reset signal;
the clamp circuit is connected at a first terminal to the power supply and connected at a second terminal to ground, wherein the clamp circuit is configured to change the voltage at the first terminal of the filter to the preset voltage in response to the mode change detection signal; and
the DC-DC converter is configured to stop operation of at least one of the oscillator, the current comparator, and the current amplifier in response to the light load mode signal.

4. The DC-DC converter of claim 3, wherein the monitoring circuit is configured to output the mode change detection signal for a preset period when the output signal of the mode comparator changes from the light load mode signal to the normal mode signal, and
the clamp circuit is configured to change the voltage at the first terminal of the filter to the preset voltage for the preset period in response to the mode change detection signal.

5. The DC-DC converter of claim 4, wherein the monitoring circuit comprises:
a delay circuit configured delay an output signal of the mode comparator by the prescribed time and to output the delayed output signal, and
an AND circuit comprising an inverting input terminal configured to receive output signal of the mode comparator, and a non-inverting input terminal configured to receive the delayed output signal of the delay circuit, wherein the AND circuit is configured to output the mode change detection signal.

6. The DC-DC converter of claim 1, wherein the filter comprises:
a filter resistor comprising a first terminal connected to the output of the error amplifier, and a second terminal connected to ground; and
a filter capacitor connected in series with the filter resistor.

7. The DC-DC converter of claim 1, wherein the voltage divider comprises:
a first voltage division resistor comprising a first terminal connected to the output terminal, and a second terminal; and
a second voltage division resistor comprising a first terminal connected to the second terminal of the first voltage division resistor, and a second terminal connected to ground,
wherein the voltage divider is configured to output a divided voltage at a node connected to the second terminal of the first voltage division resistor.

8. The DC-DC converter of claim 1, wherein the assisting circuit comprises a sub-amplifier comprising an output terminal connected to the output of the error amplifier, wherein the sub-amplifier is configured to receive the reference voltage and an added voltage comprising an offset voltage plus the divided voltage.

9. The DC-DC converter of claim 8, wherein the error amplifier comprises an inverting input terminal configured to receive the divided voltage, and a non-inverting input terminal configured to receive the reference voltage, and the sub-amplifier comprises an inverting input terminal configured to receive the added voltage, and a non-inverting input terminal configured to receive the reference voltage.

10. The DC-DC converter of claim 8, further comprising an offset circuit configured to add the offset voltage to the divided voltage and to output the added voltage.

11. A semiconductor integrated circuit capable of interoperating with a DC-DC converter, wherein the DC-DC converter is configured to turn off at least an unnecessary circuit part of the DC-DC converter when operating in a light load mode, the DC-DC converter comprising:
a first MOS transistor connected at a first terminal to a power supply and connected at a second terminal to a first node;
a second MOS transistor connected at a first terminal to the first node and connected at a second terminal to ground;
a coil connected at a first terminal to the first node and connected at a second terminal to an output terminal;
a capacitor connected at a first terminal to the second terminal of the coil and connected at a second terminal to ground; and
a voltage divider configured to divide a voltage at the output terminal and to output the divided voltage,
wherein the semiconductor integrated circuit comprises:
an error amplifier capable of receiving the divided voltage and a reference voltage, wherein the error amplifier is configured to output a voltage based on compare a reference voltage to the divided voltage;
a filter connected at a first terminal to the output of the error amplifier and capable of being connected at a second terminal to ground, wherein the filter is configured to compensate for a phase of the voltage signal output by the error amplifier;
a control circuit configured to turn the first MOS transistor and the second MOS transistor on and off in a complementary manner by outputting control signals to gates of the first MOS transistor and the second MOS transistor, the control signals being pulse signals;
a mode comparator configured to receive the voltage output from the error amplifier and a threshold voltage, wherein the mode comparator is configured to output a normal mode signal when the voltage output from the error amplifier is greater than the threshold voltage, and to output a light load mode signal when the voltage output from the error amplifier is less than the threshold voltage; and
an assisting circuit configured to assist boosting of the voltage output from the error amplifier when the output signal of the mode comparator changes from the light load mode signal to the normal mode signal.

12. The semiconductor integrated circuit of claim 11, wherein the assisting circuit comprises a clamp circuit configured to change a voltage at the first terminal of the filter to a preset voltage when the output signal of the mode comparator changes from the light load mode signal to the normal mode signal.

13. The semiconductor integrated circuit of claim 12, further comprising:
a current detection resistor capable of being connected at a first terminal to the power supply and capable of being connected at a second terminal to the first terminal of the first MOS transistor;
a current amplifier configured to output a voltage based on a current flowing through the current detection resistor;
a current comparator configured to receive the voltage output from the error amplifier and the voltage output from the current amplifier, wherein the current comparator is configured to compare the voltage output from the error amplifier with the voltage output from the current amplifier and to output a reset signal based on the result;
an oscillator configured to output a set signal, wherein the set signal is oscillating; and
a monitoring circuit configured to monitor the output signal of the mode comparator, and to output a mode change detection signal when the output signal of the mode comparator changes from the light load mode signal to the normal mode signal,
wherein the control circuit is configured to turn the first MOS transistor and the second MOS transistor on and off in a complementary manner by outputting the control signal according to the set signal, and to control a pulse duty ratio of the control signal according to the reset signal;
the clamp circuit is capable of being connected at a first terminal to the power supply and capable of being connected at a second terminal to ground, wherein the clamp circuit is configured to change the voltage at the first terminal of the filter to the preset voltage in response to the mode change detection signal; and
the DC-DC converter is configured to stop operation of at least one of the oscillator, the current comparator, and the current amplifier in response to the light load mode signal.

14. The semiconductor integrated circuit of claim 13, wherein the monitoring circuit is configured to output the mode change detection signal for a preset period when the output signal of the mode comparator changes from the light load mode signal to the normal mode signal, and
the clamp circuit is configured to change the voltage at the first terminal of the filter to the preset voltage for the preset period in response to the mode change detection signal.

15. The semiconductor integrated circuit of claim 14, wherein the monitoring circuit comprises:
a delay circuit configured delay an output signal of the mode comparator by the prescribed time and to output the delayed output signal, and
an AND circuit comprising an inverting input terminal configured to receive output signal of the mode comparator, and a non-inverting input terminal configured to receive the delayed output signal of the delay circuit, wherein the AND circuit is configured to output the mode change detection signal.

16. The semiconductor integrated circuit of claim 11, wherein the filter comprises:
a filter resistor comprising a first terminal connected to the output of the error amplifier, and a second terminal connected to ground; and
a filter capacitor connected in series with the filter resistor.

17. The semiconductor integrated circuit of claim 11, wherein the voltage divider comprises:
a first voltage division resistor comprising a first terminal connected to the output terminal, and a second terminal; and
a second voltage division resistor comprising a first terminal connected to the second terminal of the first voltage division resistor, and a second terminal connected to ground,
wherein the voltage divider is configured to output a divided voltage at a node connected to the second terminal of the first voltage division resistor.

18. The semiconductor integrated circuit of claim 11, wherein the assisting circuit comprises a sub-amplifier comprising an output terminal connected to the output of the error amplifier, wherein the sub-amplifier is configured to receive the reference voltage and an added voltage comprising an offset voltage plus the divided voltage.

19. The semiconductor integrated circuit of claim 18, wherein the error amplifier comprises an inverting input terminal configured to receive the divided voltage, and a non-inverting input terminal configured to receive the reference voltage, and the sub-amplifier comprises an inverting input terminal configured to receive the added voltage, and a non-inverting input terminal configured to receive the reference voltage.

20. The semiconductor integrated circuit of claim 18, further comprising an offset circuit configured to add the offset voltage to the divided voltage and to output the added voltage.

* * * * *